United States Patent [19] [11] Patent Number: 4,911,524
Itoh et al. [45] Date of Patent: Mar. 27, 1990

[54] METHOD AND APPARATUS FOR FUSION-SPLICING POLARIZATION MAINTAINING OPTICAL FIBERS

[75] Inventors: Kenichiroh Itoh, Sakura; Mikio Yoshinuma; Naomichi Suzuki, both of Yachiyo; Takeshi Yamada; Hiroyuki Taya, both of Sakura, all of Japan

[73] Assignee: Fujikura Ltd., Tokyo, Japan

[21] Appl. No.: 355,919

[22] Filed: May 23, 1989

Related U.S. Application Data

[62] Division of Ser. No. 278,602, Dec. 1, 1988.

[30] Foreign Application Priority Data

Dec. 4, 1987 [JP] Japan ................. 62-307192
Dec. 4, 1987 [JP] Japan ................. 62-307193
Mar. 7, 1988 [JP] Japan ................. 63-52799

[51] Int. Cl.$^4$ ............................................. G02B 6/36
[52] U.S. Cl. ............................................. 350/96.21
[58] Field of Search ................. 350/96.20, 96.21, 96.22

[56] References Cited

U.S. PATENT DOCUMENTS 4,603,941  8/1986  Fujii et al. ............ 350/96.21 X
4,725,297  2/1988  Grigsby et al. ........ 350/96.21 X
4,749,252  6/1988  Yanagi et al. .......... 350/96.21
4,812,010  3/1989  Osaka et al. .......... 350/96.21 X Primary Examiner—William L. Sikes
Assistant Examiner—Akm E. Ullah
Attorney, Agent, or Firm—Frishauf, Holtz, Goodman & Woodward

[57] ABSTRACT $\theta$-clamp also serves as a jacket clamp. The clamp comprises a cover mounted on an arm by a hinge and kept closed by a magnet, so that a pusher provided in the cover is urged against a jacketed portion of an optical fiber by a spring. In this state, the fiber is rotated in a $\theta$ direction by rotating a dial. $\theta$-clamp also serves as a jacket clamp. Therefore, 1. The $\theta$-clamp can be positioned close to a fiber clamp. For this reason, the optical fiber is not twisted during $\theta$-axes alignment, and a follow-up property of rotation of the optical fiber with respect to rotation of the $\theta$ axis is improved. In addition, the apparatus need not be adjusted so as not to twist the optical fiber. 2. The distance between fiber clamp and $\theta$-clamp is shortened. Therefore, when the optical fiber is clamped and moved in the z direction, the jacketed portion is not flexed. For this reason, a follow-up property of movement of the end face of the optical fiber with respect to movement of a table in the z-axis direction is improved.

3 Claims, 13 Drawing Sheets

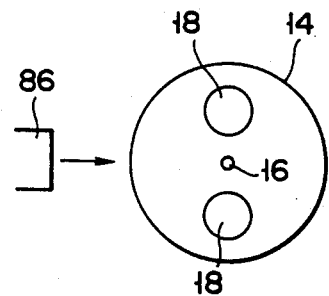
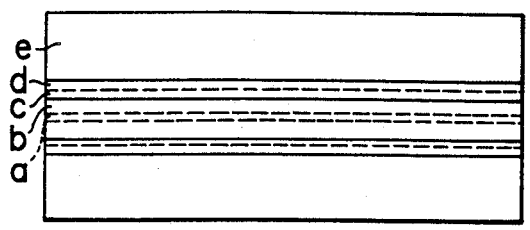
FIG. 6A            FIG. 6B
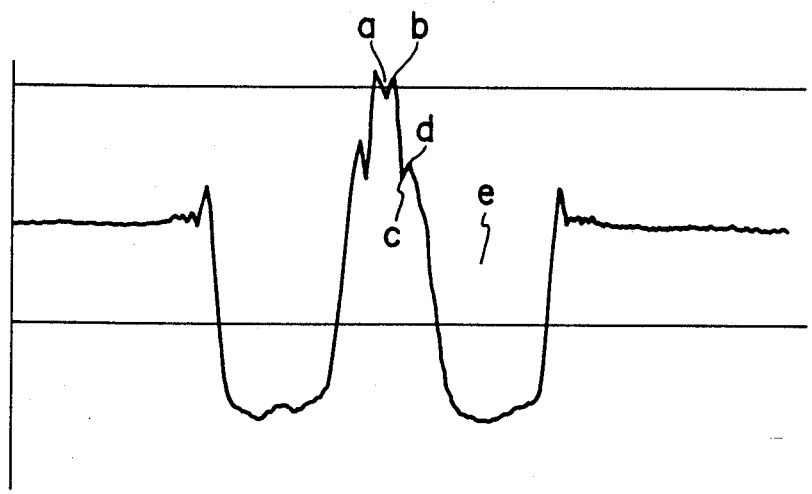
FIG. 6C

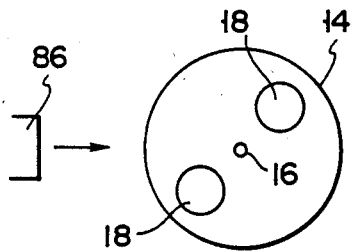
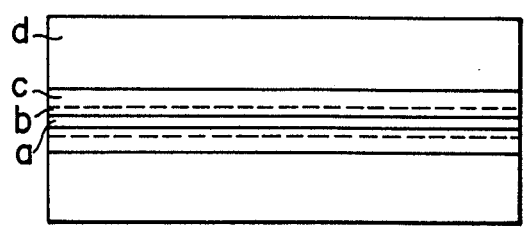
FIG. 7A          FIG. 7B
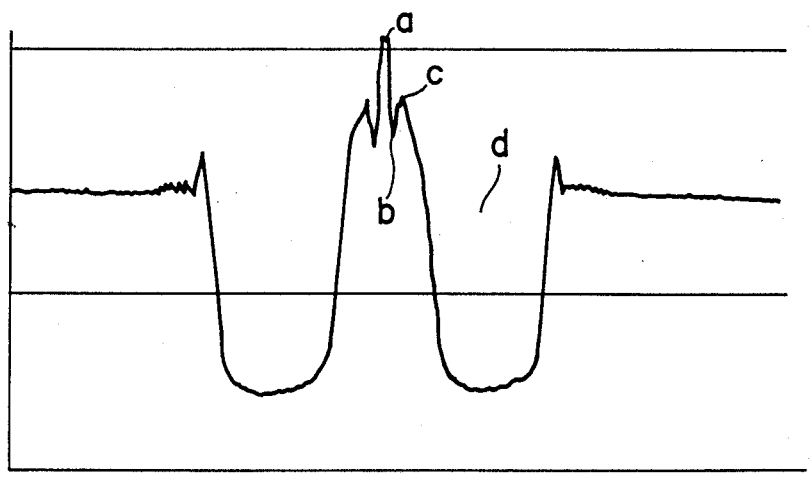
FIG. 7C

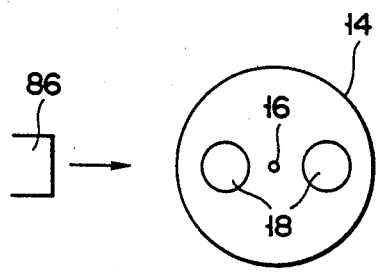
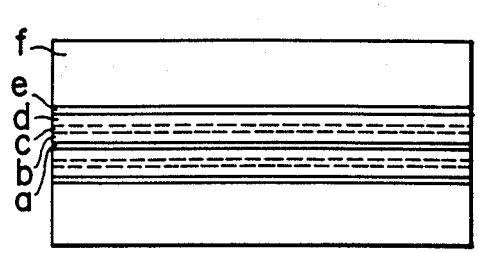
FIG. 8A    FIG. 8B
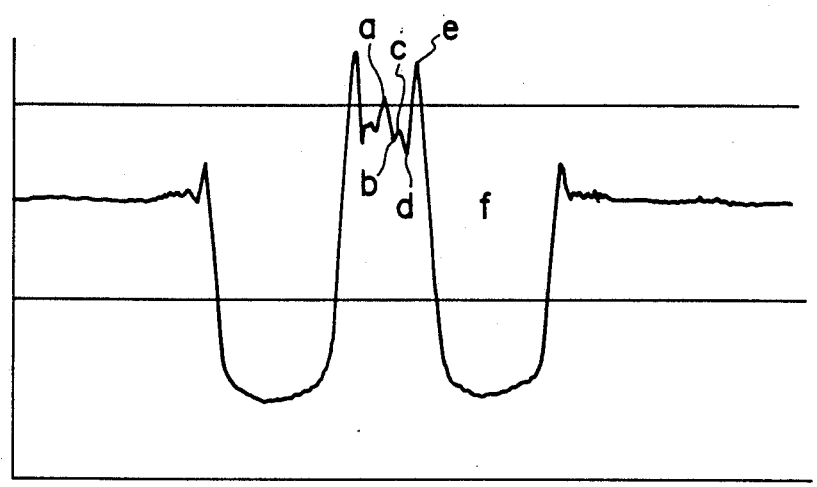
FIG. 8C

METHOD AND APPARATUS FOR FUSION-SPLICING POLARIZATION MAINTAINING OPTICAL FIBERS

This is a division of application Ser. No. 278,602 filed Dec. 1, 1988.

BACKGROUND OF THE INVENTION

1. Field of the Invention

The present invention relates to a method of fusion-splicing polarization maintaining optical fibers.

2. Description of the Related Art

As shown in FIGS. 1A to 1C, polarization maintaining optical fiber 14 has core 16 at its center and a pair of stress applying members 18 at both sides of the core. This type of fiber is generally called a "PANDA" type fiber. In order to fusion-splice two such fibers 14, alignment of fibers 14 is performed such that the direction which is perpendicular to the axes of the stress applying members 18 of one of the optical fibers is so arranged as follows with respect to the direction which is perpendicular to the axes of the stress applying members 18 of the other of the optical fibers. That is, as shown in FIG. 1A, the two directions are the same each other; as shown in FIG. 1B, one direction is shifted from the other through 90°; and as shown in FIG. 1C, one direction is shifted from the other through 45°. For this purpose, in addition to alignment in the x and y directions and adjustment of an interval between fiber ends in the z direction, alignment in the circumferential direction, i.e., the $\theta$ direction must be performed.

FIGS. 2A and 2B show an apparatus (Japanese Patent Application No. 61-115901) for fusion-splicing a pair of polarization maintaining optical fibers.

In FIGS. 2A and 2B, reference numerals 10 denote polarization maintaining optical fibers; 12, jacketed fiber portions; and 14, exposed fiber portions.

Reference numerals 20 denote V-groove blocks capable of moving in the x and y directions. Each fiber 14 is placed on block 20 and clamped by fiber clamp 22.

Reference numerals 24 denote z-axis tables. Each jacketed portion 12 is placed on table 24 and clamped by jacket clamp 26. Each table 24 can be pivoted about pin 28 in the direction of arrow 30 so that the upper surface of table 24 moves in the z direction.

Reference numerals 32 denote brackets for rotatably supporting cylindrical members 34A and 34B. In FIG. 2A, dial 36 is directly connected to member 34A.

Two arms 38 (only one is shown in FIG. 2A; see FIG. 2B) project from each of members 34A and 34B, and $\theta$-clamps 40 are formed at their distal ends.

Each clamp 40 has V-groove 42 (FIG. 2B). When two arms 38 are moved close to each other, jacketed portion 12 is moved on guide plate 44 and received in V-grooves 42.

In this state, by rotating dial 36 connected to cylindrical member 34A, fiber 10 is rotated in its circumferential direction, i.e., the $\theta$ direction.

Gear 46 is directly connected to cylindrical member 34B and rotated by motor 48.

Table 24 and bracket 32 are mounted on a single block (not shown) capable of moving in the z-axis direction by use of a motor.

Reference numeral 50 denotes a striking rod or spacer; 52, mirrors mounted on both sides of the upper end of rod 50; and 54, a microscope.

An operation of the apparatus having the above arrangement is as follows.

(1) Fibers 10 are set in the apparatus and clamped by fiber clamps 22, jacket clamps 26 and $\theta$-clamps 40.

(2) An initial interval between end faces of fibers 10 to be fused is set.

For this purpose, rod 50 is used. That is, rod 50 is moved upward to its upper limit, and fibers 10 are moved forward in z direction until their end faces to be fused abut against the side surfaces of rod 50.

(3) Rod 50 is moved downward, and preliminary discharge (fire polish) is performed to clean the end faces and to form slight recess portions in stress applying members.

(4) Coarse alignment in the $\theta$ direction is performed.

That is, rod 50 is moved upward again to an intermediate position, and while observing through microscope 54 end face images of fibers 10 reflected by mirrors 52, dial 36 is rotated so that the positions of stress applying members 18 of the pair of fibers satisfy the predetermined relationship shown in FIGS. 1A, 1B or 1C.

(5) Alignment in the x and y directions is performed.

(6) Fine alignment in the $\theta$ direction is performed.

In order to perform alignment in the $\theta$ direction, clamps 26 are released so that fibers 10 can be rotated without any resistance.

(7) Alignment in the x and y directions is performed again (because an axis of the core is offset by $\theta$ alignment if the core is off-centered).

(8) The fibers are fusion-spliced with each other.

The above core aligning operations of (5) to (7) are performed by what is known as a remote injection and detection system.

In the above method and apparatus, however, three types of clamps 22, 26 and 40 must be used to clamp one fiber. Therefore, the following problems arise:

(1) Since clamps 22 and 40 are located far apart, fiber 10 can easily become twisted while it is rotated in the $\theta$ direction.

For this reason, very fine adjustment must be performed in order to achieve precise alignment in the $\theta$ direction.

(2) Because of the long distance between clamps 22 and 40, jacketed portion 12 is bent while x-axis table 24 moves in the z direction. Therefore, the distal end of fiber 10 cannot follow the z direction operation.

For this reason, fiber 10 moves forward/backward in the z direction upon alignment in the $\theta$ direction, or fiber 10 is not moved in a predetermined manner by the z-direction moving operation upon fusing, resulting in an unstable splicing state.

(3) A mechanism is required to release jacket clamp 26 upon $\theta$ rotation of fiber 10, the operation of the mechanism is troublesome.

SUMMARY OF THE INVENTION

The present invention has been developed in consideration of the above situation and has as its object to provide a method of fusion-splicing polarization maintaining optical fibers and an apparatus for performing the same, and which is easy to operate and can ensure a consistent standard of fusion-splicing.

The above object of the present invention has been achieved by:

(1) mounting a $\theta$-clamp on a z-axis table so that the $\theta$-clamp can move in a z direction; and (2) giving a jacket clamping function to the $\theta$-clamp.

According to the present invention, there is provided an apparatus for fusion-splicing polarization maintaining optical fibers, comprising:

V-groove member means movable in x and y directions, for receiving exposed portions of a pair of polarization maintaining optical fibers;

z-axis table means movable in z direction;

first clamp means for clamping said exposed portions of said optical fibers into said V-groove member means; and second clamp means for clamping jacket portions of said optical fibers onto said z axis table means and rotating said optical fibers in a circumferential direction thereof while clamping said jacket portions.

According to the present invention, there is further provided a method for fusion-splicing polarization maintaining optical fibers, comprising the steps of:

setting a pair of polarization maintaining optical fibers in a line; and rotating said pair of optical fibers in a circumferential direction thereof, while observing said pair of optical fibers by a core direct monitoring method, so that images of said pair of optical fibers coincide with each other.

According to the present invention, there is still further provided a method for fusion-splicing polarization maintaining optical fibers, comprising the steps of:

observing a polarization maintaining optical fiber in a predetermined direction, using a core direct monitoring method to obtain a reference image;

setting a pair of polarization maintaining optical fibers to be fusion-spliced in a line; and rotating said pair of optical fibers in a circumferential direction thereof, while observing said pair of optical fibers by a core direct monitoring method, so that images of said pair of optical fibers coincide with said reference image.

According to the present invention, there is yet further provided a method for fusion-splicing polarization maintaining optical fibers, comprising the steps of:

setting a pair of polarization maintaining optical fibers in a line; and rotating said pair of optical fibers in a circumferential direction thereof, while observing said pair of optical fibers by a core direct monitoring method, to coincide images of said pair of optical fibers with an image obtained by observing a polarization optical fiber in a predetermined direction by a core direct monitoring method.

BRIEF DESCRIPTION OF THE DRAWINGS

FIGS. 6A, 7A and 8A are views showing directions of a TV camera for observing a section of a polarization maintaining optical fiber;

FIGS. 6B, 7B and 8B are views showing images of optical fibers imaged in the viewing directions shown in FIGS. 6A, 7A and 8A by the TV camera, respectively;

FIGS. 6C, 7C and 8C are graphs of luminance profiles of the optical fiber images shown in FIGS. 6B, 7B and 8B, respectively;

DETAILED DESCRIPTION OF THE PREFERRED EMBODIMENTS

A fusion-splicing apparatus according to one embodiment of the present invention will be described below with reference to FIGS. 3A to 3C.

Figure 3A:
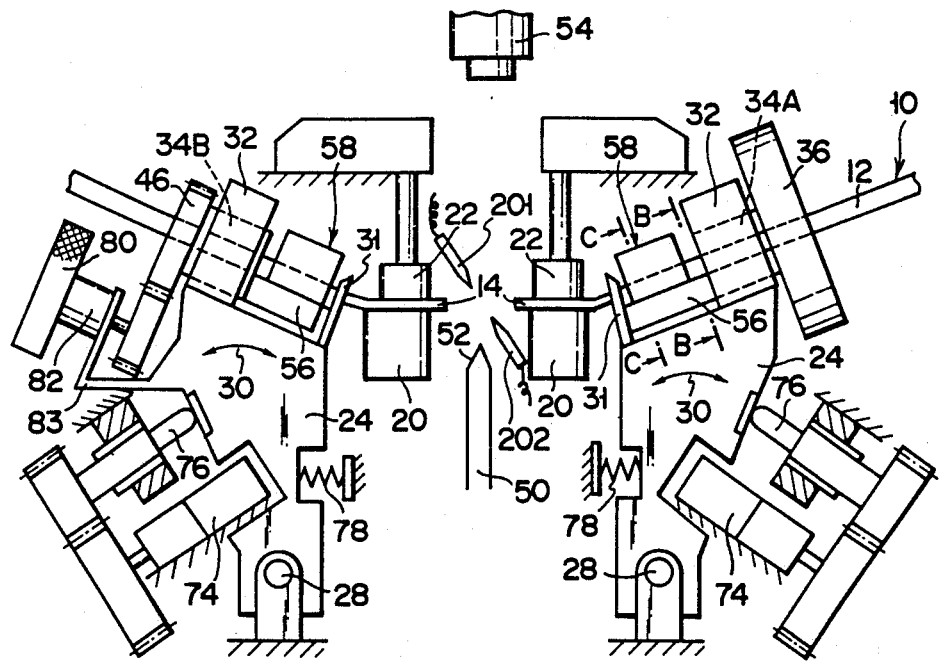
FIG. 3A is a schematic view showing an apparatus for fusion-splicing polarization maintaining optical fibers, according to an embodiment of the present invention.
Figure 3B:
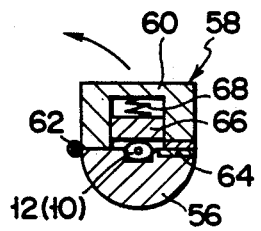
FIGS. 3B and 3C are sectional views taken along lines B—B and C—C in FIG. 3A, respectively.
Figure 3C:
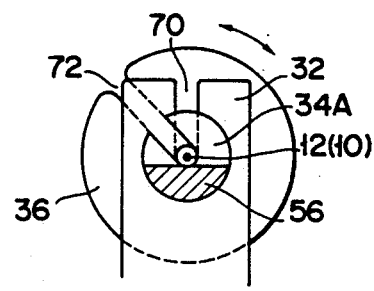

In FIGS. 3A to 3C, reference numeral 10 denotes an entire polarization maintaining optical fiber; 12, a jacketed fiber portion; and 14, exposed fiber portion.

Reference numerals 20 denote V-groove blocks capable of moving in the x and y directions. Each fiber 14 is placed on block 20 and clamped by fiber clamp 22 (first clamp means).

Z-axis tables 24 are supported by pins 28 so as to be pivoted in the directions of arrows 30. Bracket 32 is mounted on each table 24.

Brackets 32 rotatably support cylindrical members 34A and 34B. Dial 36 is directly connected to member 34A.

Arms 56 project from members 34A and 34B. Each arm 56 is of a semicircular cross-section (FIGS. 3B and 3C), and has a groove formed therein to receive jacketed portion 12 of optical fiber 10. θ-clamp 58 also serves as a jacket clamp. For the sake of illustrative convenience, arms 56 is shown in different sizes in FIGS. 3B and 3C.

Each θ-clamp 58 (second clamp means), also serving as a jacket clamp, has the structure shown in FIG. 3B, that is, cover 60 is mounted on arm 56 by hinge 62 and is kept closed by magnet 64, so that pusher 66 provided in cover 60 is urged against jacketed portion 12 of fiber 10 by spring 68. In this state, fiber 10 is rotated in θ direction by rotating dial 36.

As shown in FIG. 3C, in order to insert/remove fiber 10, groove 70 is formed in bracket 32, and groove 72 is formed in cylindrical member 34A and dial 36.

Reference numerals 74 denote motors for moving spindles 76 forward/backward, thereby pivoting tables 24. Reference numeral 31 denotes set plates.

Reference numerals 78 denote return springs for table 24.

Gear 46 is directly connected to cylindrical member 34B. By operating fine adjustment dial 80, gear 46, which is rotated via reduction gears 82, cause member 34B to be rotated, thereby achieving fine adjustment of the fiber in the $\theta$ direction.

Reference numeral 83 denotes a bracket for supporting gears 82 and dial 80.

Reference numeral 50 denotes a striking rod having mirrors 52 at both sides of its upper end; and 54, a microscope.

An operation of the above apparatus will be described below.

(1) Clamps 22 and 58 are opened, and grooves 70 and 72 are aligned to set an optical fiber therein on each side. Thereafter, clamps 22 and 58 are closed and dial 36 is rotated by a predetermined amount, so that fiber 10 is set and clamped by fiber clamp 22 and $\theta$-clamp 58, which also serves as a jacket fiber. (Clamp 58 clamps the fiber as described above.)

(2) An initial interval is set between the end faces of fibers 10 to be fused.

For this purpose, rod 50 is used as a stopper. That is, rod 50 is moved upward to its upper limit, and fibers 10 are moved forward until their end faces to be fused abut against side surfaces of rod 50.

(3) Rod 50 is moved downward to perform preliminary discharge (fire polish) for cleaning the end faces and forming slight recess portions in stress applying members.

(4) Coarse alignment in the $\theta$ direction is performed.

Figure 1A:
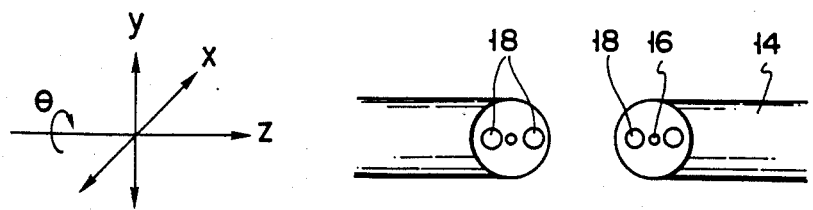
FIGS. 1A to 1C are sectional views showing a pair of polarization maintaining optical fibers to be fusion-spliced.
Figure 1B:
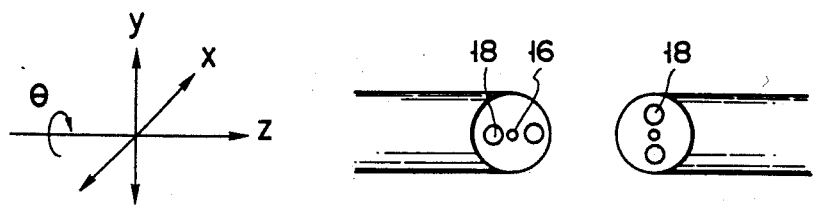
Figure 1C:
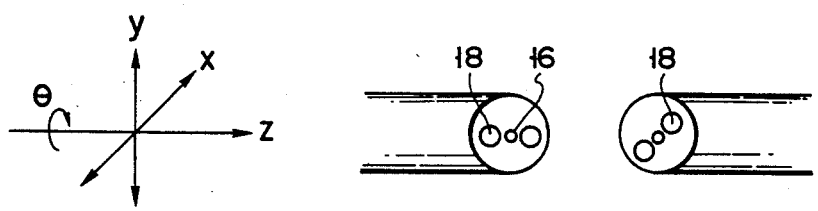
Figure 2B:
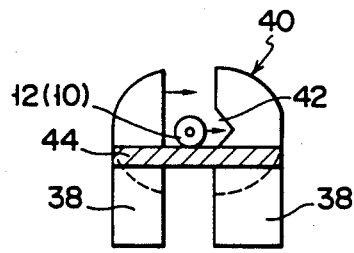
FIG. 2B is a sectional view taken along line B—B in FIG. 1.
Figure 2A:
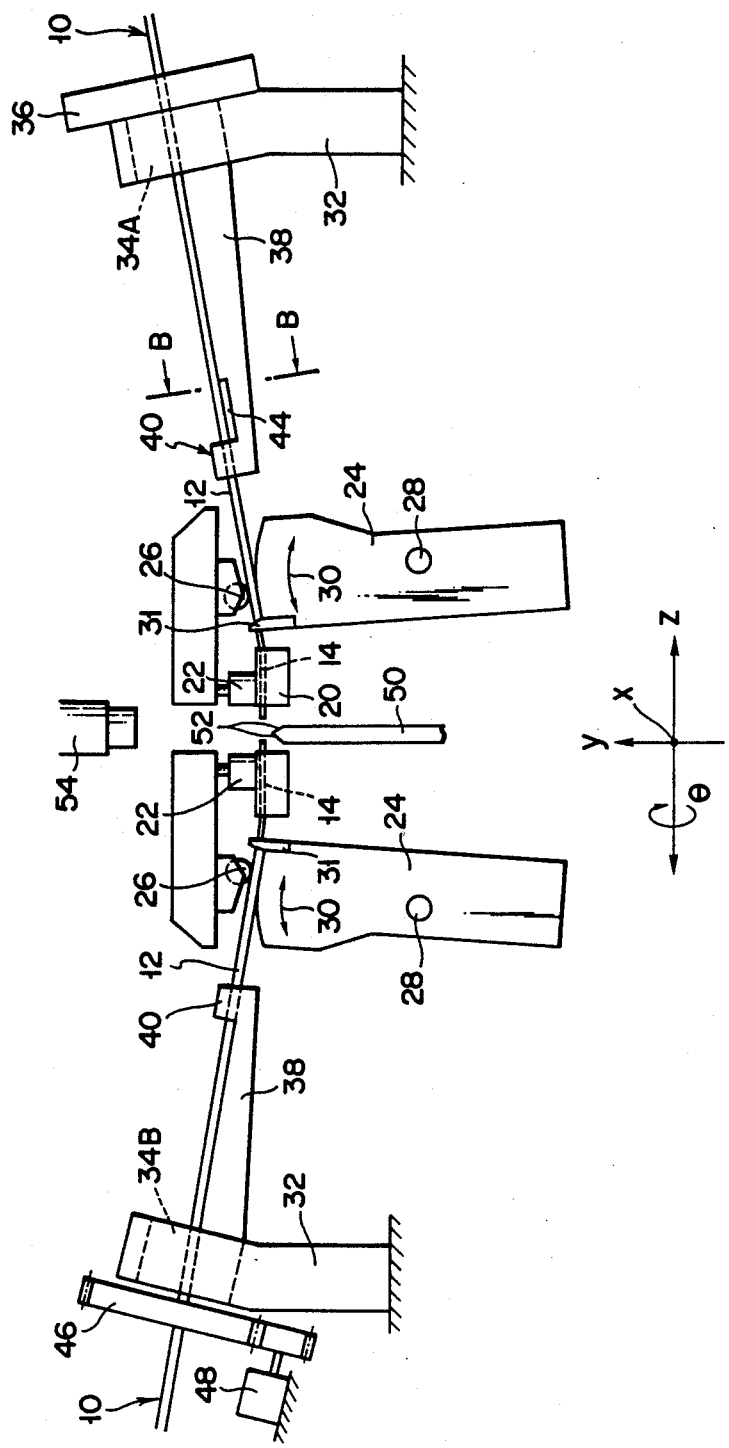
FIG. 2A is a schematic view showing a conventional apparatus for fusion-splicing polarization maintaining optical fibers.

That is, rod 50 is moved upward again to an intermediate position, and while observing end face images of fibers 10 reflected by mirrors 52 through microscope 54, dial 36 is rotated so that the positions of stress applying members 18 of the pair of fibers satisfy the predetermined relationships shown in FIGS. 1A to 1C.

(5) Alignment in the x and y directions is performed.

(6) Fine alignment in the $\theta$ direction is performed by operating dial 80 while observing a power meter.

Since no independent jacket clamp nor a resistance thereof is present, the clamps need not be released during alignment in the $\theta$ direction.

(7) Alignment in the x and y directions is performed again.

(8) A current is passed through a pair of discharge electrodes 201 and 202, and an arc is applied to the end faces to be fused, thereby fusion-splicing the fibers.

Two types of modifications of a portion associated with the $\theta$-clamp also serving as a jacket clamp will be described below.

First Modification (FIGS. 4A to 4D)

Figure 4A:
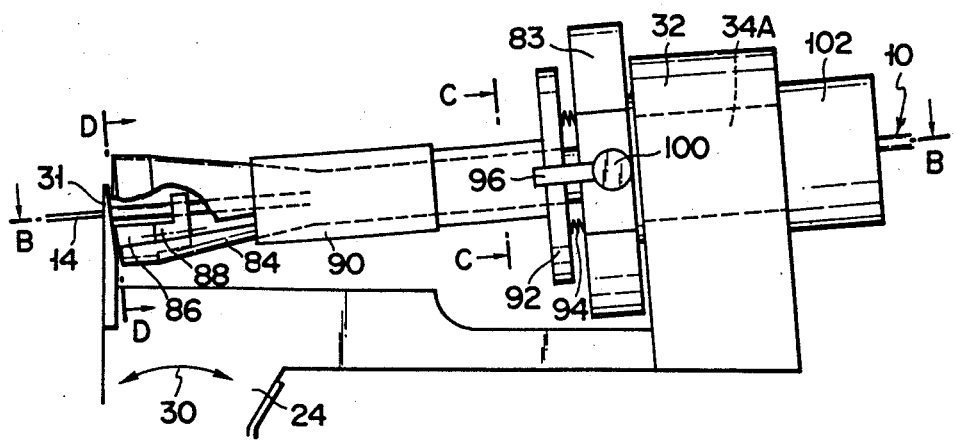
FIG. 4A is a schematic view showing a modification of part of the fusion-splicing apparatus shown in FIG. 3A.

FIG. 4A shows only a portion corresponding to the clamp portion at the right side of FIG. 3A, and FIGS. 4B, 4C and 4D show sections taken along lines B—B, C—C and D—D in FIG. 4A, repectively.

Cylindrical member 34A is rotatably supported by bracket 32 mounted on table 24. Arm 84 projects from holder 83 integrally formed with member 34A.

Figure 4B:
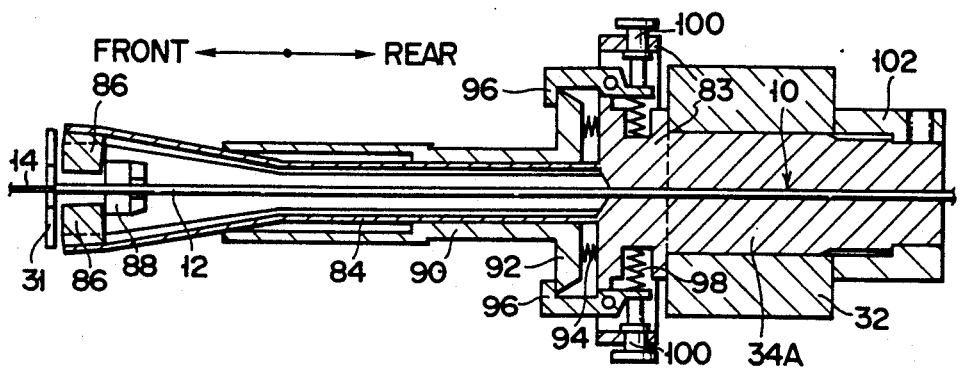
FIGS. 4B, 4C and 4D are sectional views taken along lines B—B, C—C and D—D in FIG. 4A, respectively.
Figure 4C:
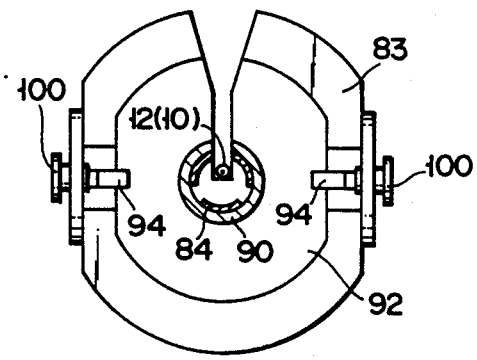
Figure 4D:
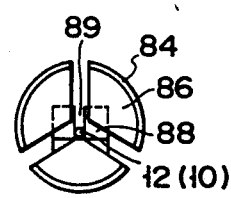

Arm 84 is obtained by dividing an elongated cylinder into three pieces, and its distal end portion is widened to be thicker than the other portion (FIG. 4B). Pushers 86 having a sector cross-section are located on the inner surfaces of arm 84 (FIG. 4B) so that jacketed portion 12 of fiber 10 is clamped by the distal end portions of pushers 86.

Reference numeral 88 denotes a sheath guide, fixed to one of pushers 86, and having groove 89 for receiving fiber 10. Sheath guide 88 guides fiber 10 to clamp it at the correct position.

Reference numeral 90 denotes a cylindrical slider having flange 92 at its rear end (front and rear ends are indicated by arrows). Slider 90 is slidably mounted on arm 84 and is biased forward by spring 94.

Reference numerals 96 denote locking pawls fixed to holder 83 by pins; 98, springs; 100, push buttons; and 102, a play removing nut.

An operation of this modification mechanism is as follows.

That is, in FIGS. 4A and 4B, pawls 96 abut against flange 92 so that slider 90 is positioned backward.

By depressing button 100, pawls 96 are removed from flange 92, and slider 90 is moved forward by a biasing force of spring 94.

Therefore, arm 84 is compressed inwardly, and pushers 86 clamp jacketed portion 12 of fiber 10.

By rotating holder 83 in this state, fiber 10 is rotated in the $\theta$ direction.

By pivoting z-axis table 24, fiber 10 is moved in the z direction.

In this mechanism, a fiber having any coating diameter can be clamped at the center (without moving guide plate 118 as in the following modification).

Figure 5A:
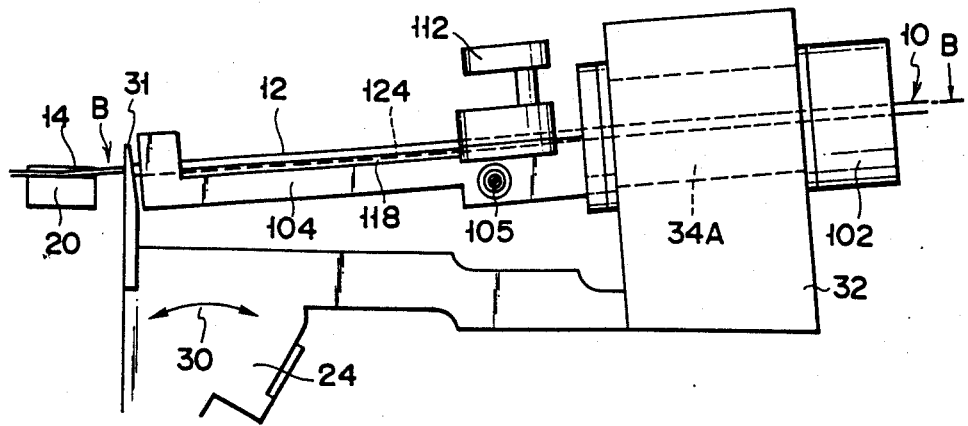
FIG. 5A is a schematic view showing another modification of part of the fusion-splicing apparatus shown in FIG. 3A.
Figure 5B:
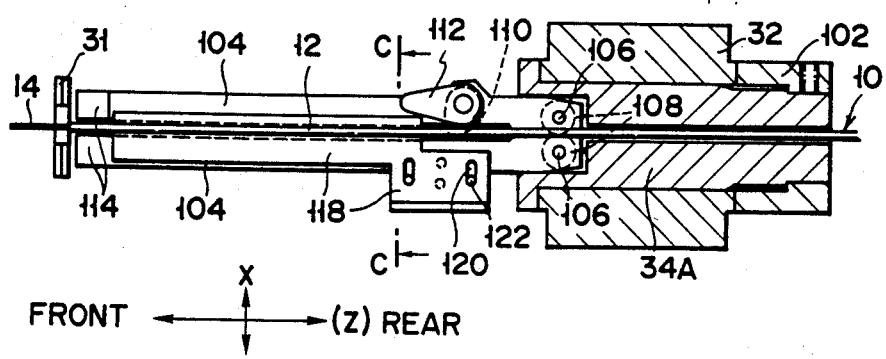
FIGS. 5B, 5C and 5D are sectional views taken along lines B—B, C—C and D—D in FIG. 5A, respectively.
Figure 5C:
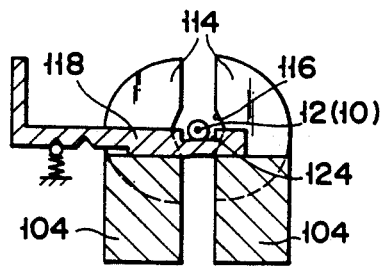

Second Modification (FIGS. 5A to 5C)

Two arms 104 project while they are mounted at their rear ends on member 34A by pins 106.

Reference numeral 108 denotes gears for opening/closing arms 104 in units of equal angles.

Reference numeral 110 denotes a cam for opening arms 104. Arms 104 are normally biased in a closing direction by tension springs 105.

Reference numeral 112 denotes a lever for rotating cam 110.

Pusher 114 is mounted at the distal end of each arm 104. Each pusher 114 has V-groove 116 (FIG. 5C).

Figure 5D:
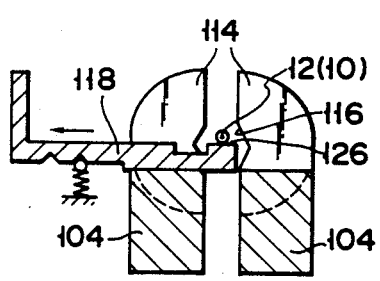

Reference numeral 118 denotes a guide plate which is an elongated plate-like member. Plate 118 is placed on arm 104 and in a parallel manner moved in the x direction by means elongated hole 120 and pin 122 (FIG. 5D).

Groove 124 in the z direction is formed in the surface of plate 118 (FIG. 5C) to receive the jacketed portion of the optical fiber.

A operation of this modification mechanism is as follows.

If fiber 10 is thick (e.g., 0.9 mm diameter), fiber 10 is supported on the bottom of groove 124.

If fiber 10 is thin (e.g., 0.25 mm diameter), plate 118 is moved to the left in FIG. 5D so that fiber 10 is placed on upper surface 126.

In this state, by closing arms 104 by cam 110, jacketed portion 12 of fiber 10 is clamped in V-groove 116.

The V-shape of V-groove 116 is formed very shallow to clamp either a thick or thin optical fiber.

In the above embodiment, the following effects can be obtained:

Since $\theta$-clamp 40 is placed on table 24 and also serves as a jacket clamp, (1) Clamp 40 can be positioned close to fiber clamp 22.

For this reason, the optical fiber is not twisted during θ-axis alignment, and a follow-up property of rotation of the optical fiber with respect to rotation of the θ axis is improved.

In addition, the apparatus need not be adjusted so as not to twist the optical fiber.

(2) The distance between fiber clamp 22 and θ-clamp 40 is shortened. Therefore, when the optical fiber is clamped and moved in the z direction, jacketed portion 12 is not flexed.

For this reason, a follow-up property of movement of the end face of the optical fiber with respect to movement of table 24 in the z-axis direction is improved. Therefore, fibers having smaller rigidity can be fusion-spliced. This is advantageous in consideration of an expected tendency in future, i.e., a tendency in which a fiber diameter or a jacket diameter is reduced and the material of a jacket is softened so as to be wound with a small diameter by a gyro or the like.

As a result, since the optical fiber is not moved in the z-axis direction during θ-axis alignment, θ-axis alignment can be performed with high precision. In addition, the optical fiber is stably moved in the z-axis direction during discharge and can therefore be stably fusion-spliced.

(3) A jacket clamp releasing mechanism need not be used. Therefore, the operation and mechanism are simplified.

In the method and apparatus of the above embodiment, rod 50 is required to serve as a fiber stopper for setting the initial interval between the end faces to be fused of fibers 10 and as a supporting member of mirrors for observing stress applying members 18. For this reason, the mechanism and operation are complicated.

In addition, if an LD (Laser Diode) light source or the like is used and an operator forgets to turn off the light source before he observes the stress applying members, his eyes may be damaged.

Moreover, end face positioning before fusion-splicing is performed by microscope observation and therefore depends on the skill of an individual operator. As a result, a stable splice-property cannot be easily obtained.

A second embodiment which solves the above problems will be described below.

In the second embodiment, the above problems are solved by:

(1) observing a pair of polarization maintaining optical fibers by a core direct maintaining method using a TV camera; and (2) performing coarse alignment in the θ direction by rotating the optical fibers in the θ or circumferential direction so that images of the optical fibers coincide with each other, and become a predetermined image.

In a single-mode optical fiber, an initial interval between end faces to be fusion-spliced has been performed using the core direct monitoring method. Also, an alignment in the x and y directions has already been performed by the core direct monitoring method.

In a polarization maintaining optical fiber, however, a core cannot be directly observed in two x and y directions because stress applying members are present. Therefore, the core direct monitoring method has not been used to observe the core of the polarization maintaining optical fiber.

However, when the polarization maintaining optical fiber is observed by the core direct monitoring method in different directions, the images of the fiber are different from one another. A course alignment in the θ direction can be easily performed by utilizing the different images. FIGS. 6B, 7B, and 8B show different images of a PANDA type polarization maintaining optical fiber when the fiber is observed in different directions.

(1) When a PANDA fiber is observed in a direction which is perpendicular to the direction perpendicular to the axes of the stress applying members 18 of the fiber (this direction is referred to as 0° direction) (FIGS. 6A to 6C):

In FIG. 6A, reference numeral 86 denotes a TV camera used for observing the optical fiber in the 0° direction.

FIG. 6B shows an optical fiber image displayed on a TV monitor, and FIG. 6C shows a luminance profile of the image.

The optical fiber image in the 0° direction (FIG. 6B) is characterized in that, as is apparent from the luminance profile in FIG. 6C in which luminance of central region a is compared with that of side regions b, region a is dark and regions b are bright.

Luminance values of regions, c, d and e located outside regions a and b are lower than those of regions a and b, i.e., slightly darker, slightly brighter and darker in the order named.

(2) When a PANDA fiber is observed in a direction which is shifted by 45° from the direction perpendicular to the axes of the stress applying members 18 of the fiber (this direction is referred to as 45° direction) (FIGS. 7A to 7C):

In FIG. 7A, TV camera 86 observes the optical fiber in the 45° direction.

FIG. 7B shows an optical fiber image displayed on a TV monitor, and FIG. 7C shows a luminance profile of the image.

The optical fiber image in the 45° direction (FIG. 7B) is characterized in that, as is apparent from the luminance profile in FIG. 7C in which luminance of central region a is compared with that of side regions b, region a is brighter than regions b.

Regions c are darker than region a but brighter than regions b, and regions d are the darkest.

The optical fiber image in the 45° direction is identical to an optical fiber image in a 135° direction. Therefore, this optical fiber image is not used for θ-direction alignment.

(3) When a PANDA fiber is observed in a direction which is parallel to the direction perpendicular to the axes of the stress applying members 18 of the fiber (this direction is referred to as 90° direction) (FIGS. 8A to 8C):

In FIG. 8A, TV camera 86 observes the optical fiber in the 90° direction.

FIG. 8B shows an optical fiber image displayed on a TV monitor, and FIG. 8C shows a luminance profile of the image.

The optical fiber image in the 90° direction (FIG. 8B) is characterized in that a core image is clearly seen in central region a.

Regions b, c, d, e and f located outside region a are as follows: regions b are darker than region a; regions c, brighter than regions b but darker than region a; regions d, darker than any of regions a, b and c; regions e, brighter than any of regions a, b, c and d; regions f, darker than any of regions a, b, c, d and e.

By utilizing different optical fiber images in accordance with observing directions, coarse alignment in the θ direction can be easily performed.

Although FIGS. 6A to 6C, 7A to 7C and 8A to 8C show images obtained by the PANDA type polarization maintaining optical fiber, characteristic optical fiber images different from the above images can be obtained by another type of polarization maintaining optical fiber.

An embodiment of a fusion-splicing apparatus utilizing the above difference between optical fiber images will be described below with reference to FIGS. 9A to 9C.

In this apparatus, of the following operations performed before an arc-discharge step, that is:

(1) setting of an initial interval between end faces to be fusion-spliced of optical fibers;
(2) coarse alignment in the θ direction;
(3) alignment in the x and y directions;
(4) fine alignment in the θ direction; and
(5) re-alignment in the x and y directions, only the following operations:
(1) interval setting and
(2) θ-direction coarse alignment are performed by the core direct monitoring method, and
(3) x- and y-direction alignment,
(4) θ-direction fine alignment and
(5) x- and y-direction re-alignment are performed by the remote injection and detection system, using a power meter as in the conventional apparatus.

If eccentricity of a core is small, however, x- and y-direction alignment can be performed by outer diameter alignment (in this case, no power meter is required). In addition, since images are clearly seen on a screen as shown in FIGS. 6B, 7B and 8B, θ-direction fine alignment can be performed by the core direct monitoring method without using a polarizer, an analyzer, a sensor, and a power meter.

In the apparatus according to the this embodiment, although a θ-clamp also serves as a jacket clamp, this is not an essential feature in this embodiment, and the clamp may be independent ones in this embodiment.

The apparatus of this embodiment is substantially the same as that shown in FIGS. 3A to 3C except that striking rod 50 is omitted from this embodiment, and therefore only a different part will be described.

Figure 9A:
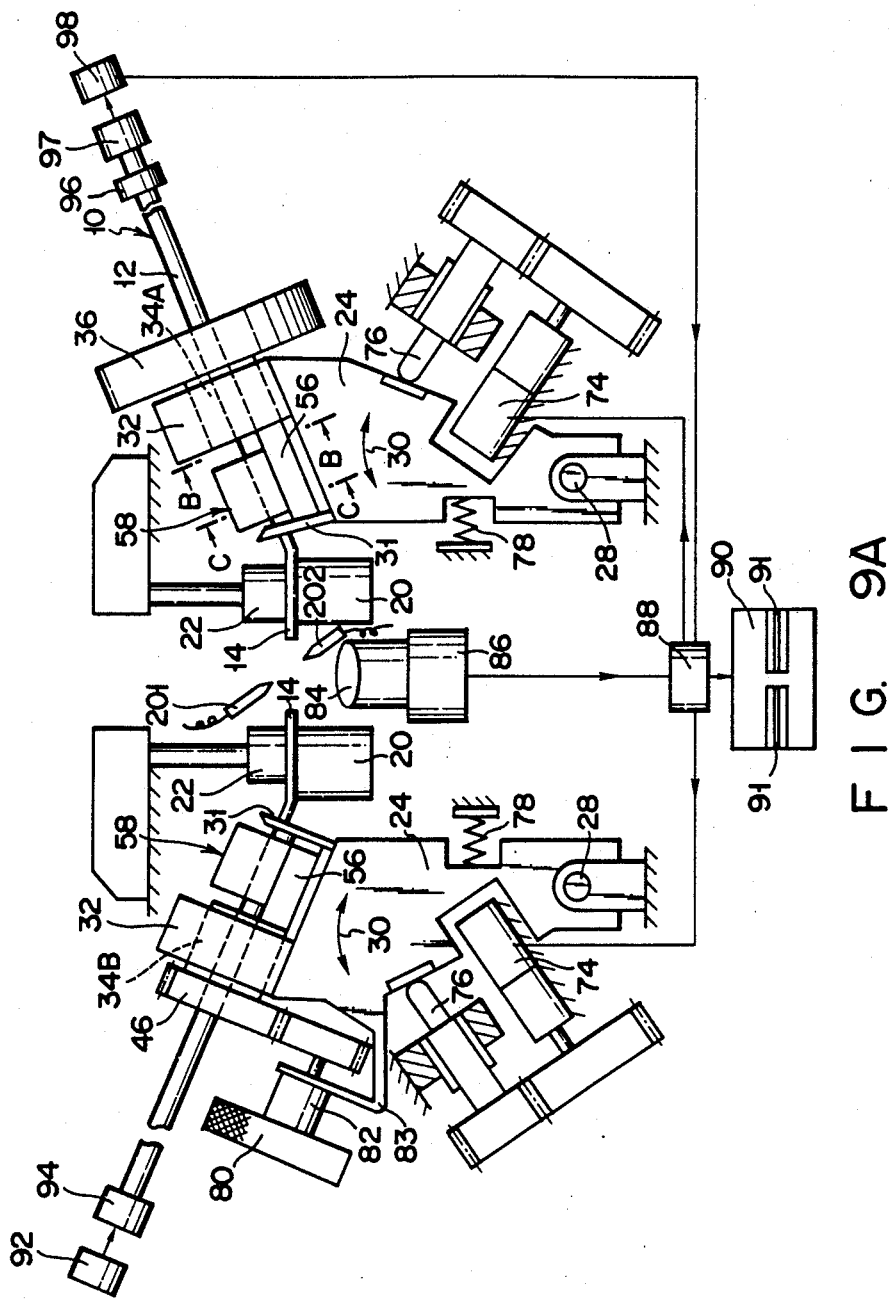
FIG. 9A is a schematic view showing an apparatus for fusion-splicing polarization maintaining optical fibers, according to a second embodiment of the present invention.
Figure 9B:
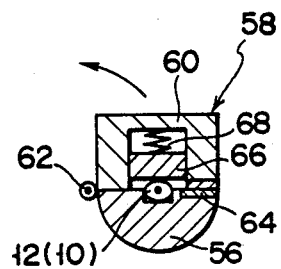
FIGS. 9B and 9C are sectional views taken along lines B—B and C—C in FIG. 9A.
Figure 9C:
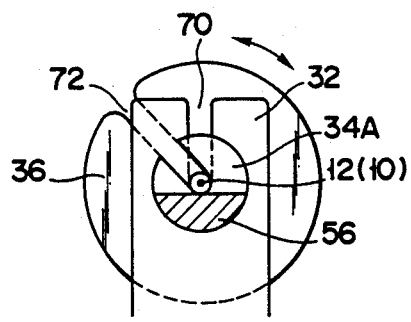

In FIGS. 9A to 9C, reference numeral 84 denotes an objective lens arranged above end faces to be fused of optical fibers; 86, a TV camera for imaging the fiber end faces through objective lens 84; and 88, a control unit for data-processing an image signal obtained by camera 86 and driving motor 74 and TV monitor 90; and 91, optical fiber images displayed on monitor 90.

Reference numeral 92 denotes a light source; 94, a polarizer for polarizing and directing a light beam from light source 92 to fiber 10; 96, an analyzer for analyzing the light beam guided from light source 92 through fiber 10; 97, a sensor for sensing the analized light beam; and 98, an optical power meter for measuring the intensity of the sensed light beam.

An operation of the apparatus having the above arrangement is as follows:

(1) Setting a pair of polarization maintaining optical fibers 10 in a line. The fibers 10 are set in a line by inserting the fibers into the V-grooves of V-groove blocks 20.

(2) Automatically setting of an initial interval between end faces to be fusion-spliced of the fibers.

An initial interval is set using camera 86 as in the conventional method for a single-mode optical fiber.

That is, fiber images obtained by camera 86 through lens 84 are processed by control unit 88, motors 74 are rotated by a signal from unit 88 to pivot z-axis tables 24, and optical fibers 10 are moved in the z-axis direction, thereby automatically adjusting the end face interval.

Thereafter, preliminary discharge (fire polish), focusing of lens 84 and cleaving angle examination of the end faces are automatically performed as in the case of a single-mode optical fiber.

(3) θ-direction coarse alignment.

Dial 36 and fine adjustment dial 80 are rotated so that images 91 of fiber 10 coincide with each other and become an image of those shown in FIG. 6B, 7B or 8B.

(3) If, as shown in FIG. 1B, the direction perpendicular to the axes of stress applying members 18 of one fiber is offset by 90° from that in the other fiber, dial 36 is further rotated through 90°.

The above operations are performed by the core direct monitoring method, but the following operations are performed by the remote infection and detection system.

(4) X- and y-direction alignment.

V-groove 20 is finely moved in x and y directions while monitoring power meter 98. Outer diameter alignment can be performed by image processing.

(5) θ-direction fine alignment.

θ-direction fine alignment is performed by rotating dial 80 while monitoring meter 98. This alignment can be performed by the core direct monitoring method in accordance with required alignment precision.

(6) The fibers are fusion-spliced to each other.

According to the method and apparatus of this embodiment, a pair of polarization maintaining optical fibers are observed by the core direct monitoring method, and the optical fibers are rotated in the θ direction so that optical fiber images of both the fibers coincide with each other, and become a predetermined image, thereby performing θ-direction coarse alignment. As a result, the following effects can be obtained.

(1) An initial end face interval can be automatically set. For this reason, a splice-defect caused by an end face interval setting failure is prevented, and therefore fibers can be stably fusion-spliced.

In addition, an operation method can be simplified, and a working efficiency can be improved.

(2) A striking rod or a mirror can be omitted. Therefore, a mechanism can be simplified, and fine adjustment of the mechanism need not be performed. An operation method can be simplified.

(3) SM and GI fibers can be easily fusion-spliced by a fusion-splicing apparatus of a core direct monitoring type.

In the above embodiment (FIGS. 9A to 9C), the θ axis is manually rotated, and therefore alignment precision of the θ axis depends on a skill of an operator.

For this reason, an extinction ratio depends on a skill of an individual operator.

In addition, a stabilized light source, a power meter, a polarizer, a sensor, and an analyzer must be used. In particular, it takes a very long time to adjust the polarizer and analyzer for each splicing operation.

Figure 10A:
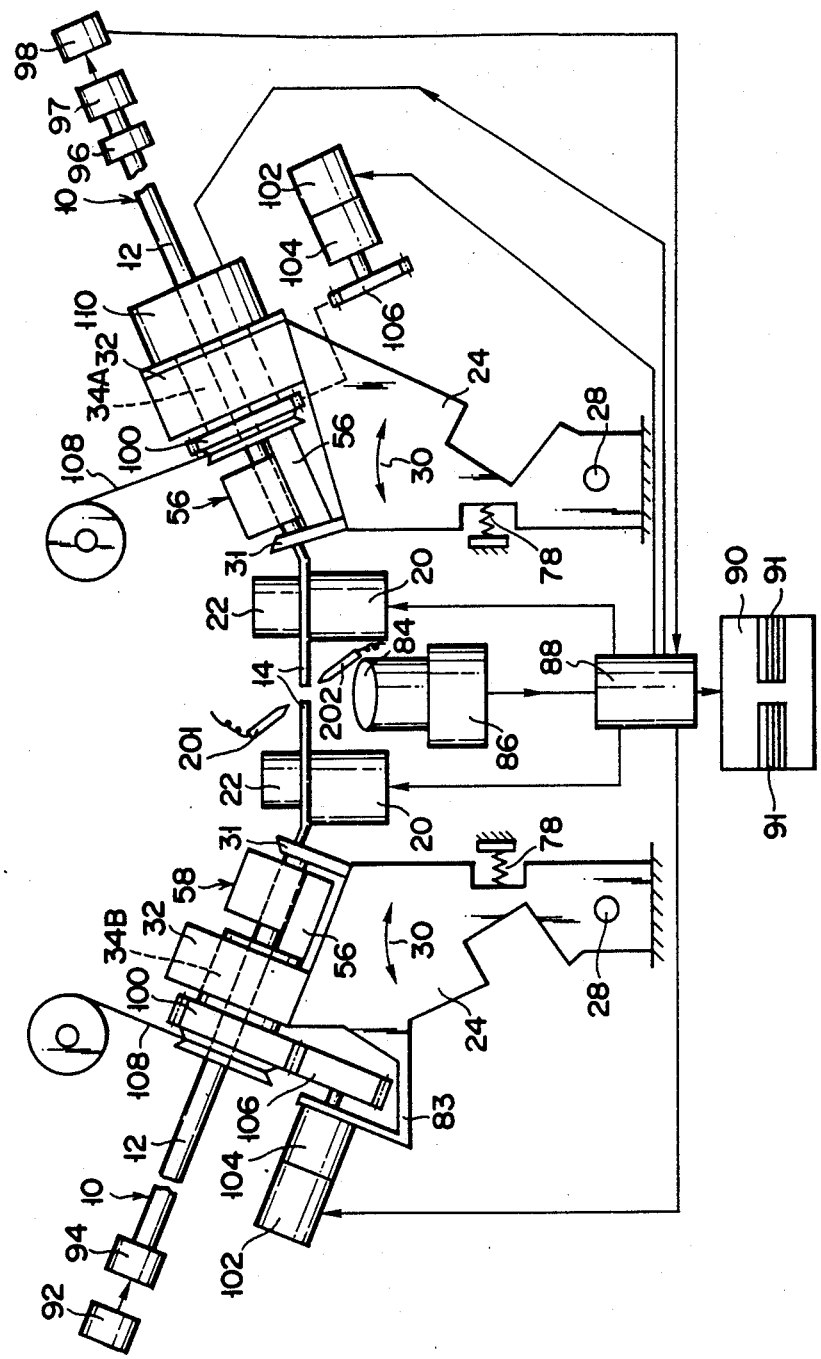
FIG. 10A is a schematic view showing an apparatus for fusion-splicing polarization maintaining optical fibers, according to a third embodiment of the present invention; 10
Figure 10B:
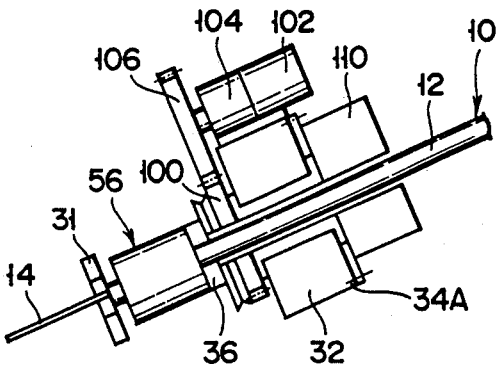
FIG. 10B is a sectional view taken along line B—B in FIG. 10A.

FIGS. 10A and 10B show a third embodiment of the present invention.

The third embodiment solves the above problems in the embodiment shown in FIGS. 9A to 9C.

In this embodiment, (1) a polarization maintaining optical fiber is observed from 90° and 0° directions by the core direct monitoring method to obtain first and second reference optical fiber images, respectively, (2) a pair of polarization maintaining optical fibers to be fusion-spliced are set in a line, (3) the pair of optical fibers are automatically rotated in the θ direction, while observing the pair of optical fibers by the core direct monitoring method, so that images of the pair of optical fibers coincides with one of the reference fiber images, and (4) one of the pair of optical fibers is further automatically rotated through 90° or 45°, if necessary.

As shown in FIGS. 10A and 10B, gear 100 is directly connected to cylindrical member 34A. Gear 100 is rotated by DC motor 102 (or a stepping motor) through reduction gears 104 and gear 106.

In FIG. 10A, the positions of motor 102 and the associated members are shown in a position different from a position where they are in fact provided, for clearly showing a relationship with respect to control unit 88.

In practice, motor 102 is mounted on an appropriate position of bracket 32 or the like. Motor 102 is rotated on the basis of a control output from unit 88.

Reference numeral 108 denotes a constant-tension spring for preventing backlash of the gear.

Reference numeral 110 denotes a rotational angle detector comprising, e.g., a rotary encoder (with an origin). Detector 110 is fixed on bracket 32 so that its output shaft is directly connected to cylindrical member 34A, and detects a rotational angle of member 34A. Detector 110 rotates on the basis of a control output from unit 88.

Detector 90 is not provided at cylindrical member 34B side, but it may be provided at this side as well.

In FIGS. 10A to 10C, the same reference numerals as in the embodiment shown in FIGS. 9A to 9C denote the same parts, and a detailed description thereof will be omitted.

An operation of the above embodiment will be described below.

AUTOMATIC θ ALIGNMENT:

(1) When the direction which is perpendicular to the axes of the stress applying members of one of a pair of polarization maintaining optical fibers is the direction which is perpendicular to the axes of the stress applying members of the other of the pair of polarization maintaining optical fibers (FIG. 1A):

When a PANDA type polarization maintaining optical fiber is observed from 90° and 0° directions, the first and second reference images of the fiber are as shown in FIGS. 6B and 8B, respectively. In this case, the image obtained by observation from the 90° direction (FIG. 8B) is used in alignment because the characteristics can be easily extracted therefrom.

Calculation is performed by control unit 88 on the basis of (1) the width of regions e having highest luminance in the luminance profile of FIG. 6B, (2) a mutual interval between regions e, and (3) the width of region a. The calculated data is stored in control unit 88.

A pair of polarization maintaining optical fibers 10 are set in a line, and their fiber images are obtained by the core direct monitoring method. The obtained images are analyzed on the basis of the above factors (1), (2) and (3) by control unit 88, and the analyzed data is compared with the above stored data by control unit 88. Unit 88 controls rotation of DC motor 82 according to the comparison result to control rotation of the fibers so that the analyzed data coincides with the stored data or a difference between the two data is minimized. In this way, θ alignment is automatically performed so that stress applying members 18 of fibers 10 coincide with each other.

(2) When the direction which is perpendicular to the axes of the stress applying members of one of a pair of polarization maintaining optical fibers is shifted by 45° (FIG. 1C) or 90° (FIG. 1B) from the direction which is perpendicular to the axes of the stress applying members of the other of the pair of polarization maintaining optical fibers:

First, stress applying members 18 are caused to coincide with each other, as mentioned in the first case (1). Thereafter, motor 102 is further rotated by a control output from control unit 88 according to a predetermined data of angle stored in unit 88, so that cylindrical member 34A is rotated through 45° or 90°, while the rotational angle of cylindrical member 34A is detected by rotational angle detector 110. In this manner, a desired θ-axis alignment can be automatically obtained.

OPERATION BOX: (FIG. 11)

Figure 11:
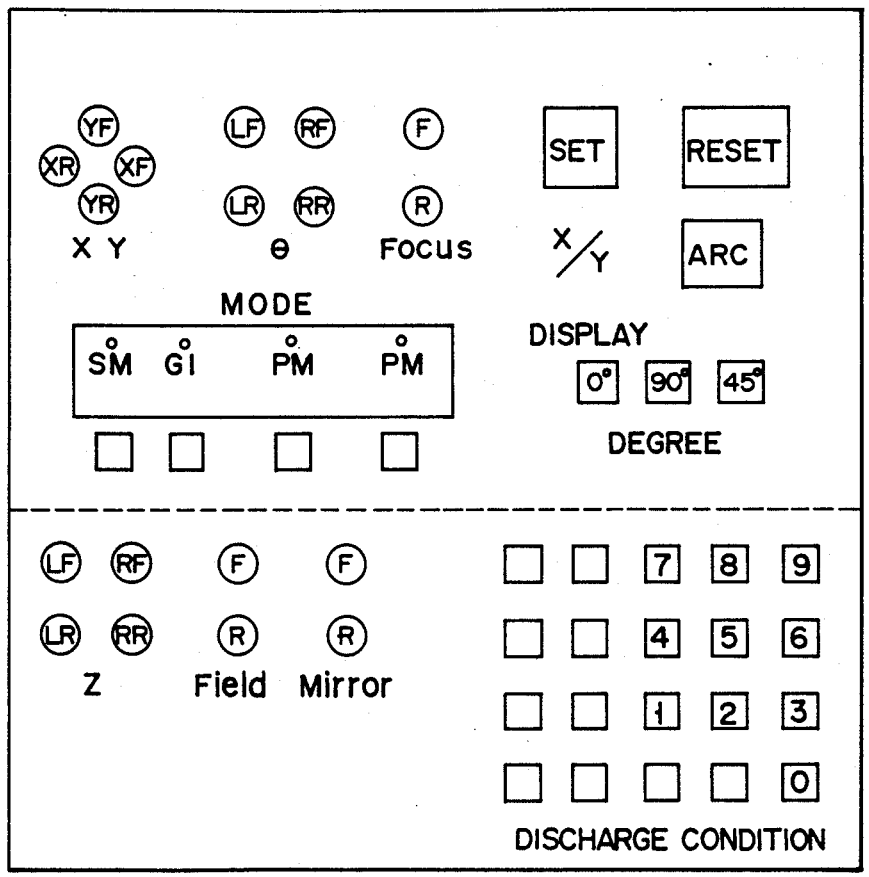
FIG. 11 is a view showing operation modes of an operation box in the fusion-splicing apparatus shown in FIG. 10A.

An operation box is shown in FIG. 11 for a reference. This operation box is of a wireless control type or is serial-port-connected to the apparatus main body.

Since the apparatus of the above embodiment is of a full-automatic type, only "SET" and "RESET" buttons are normally used.

Other buttons are used in a manual operation, and a switch is used for changing discharge conditions or maintenance.

SEQUENCE: (FIG. 12)

Figure 12:
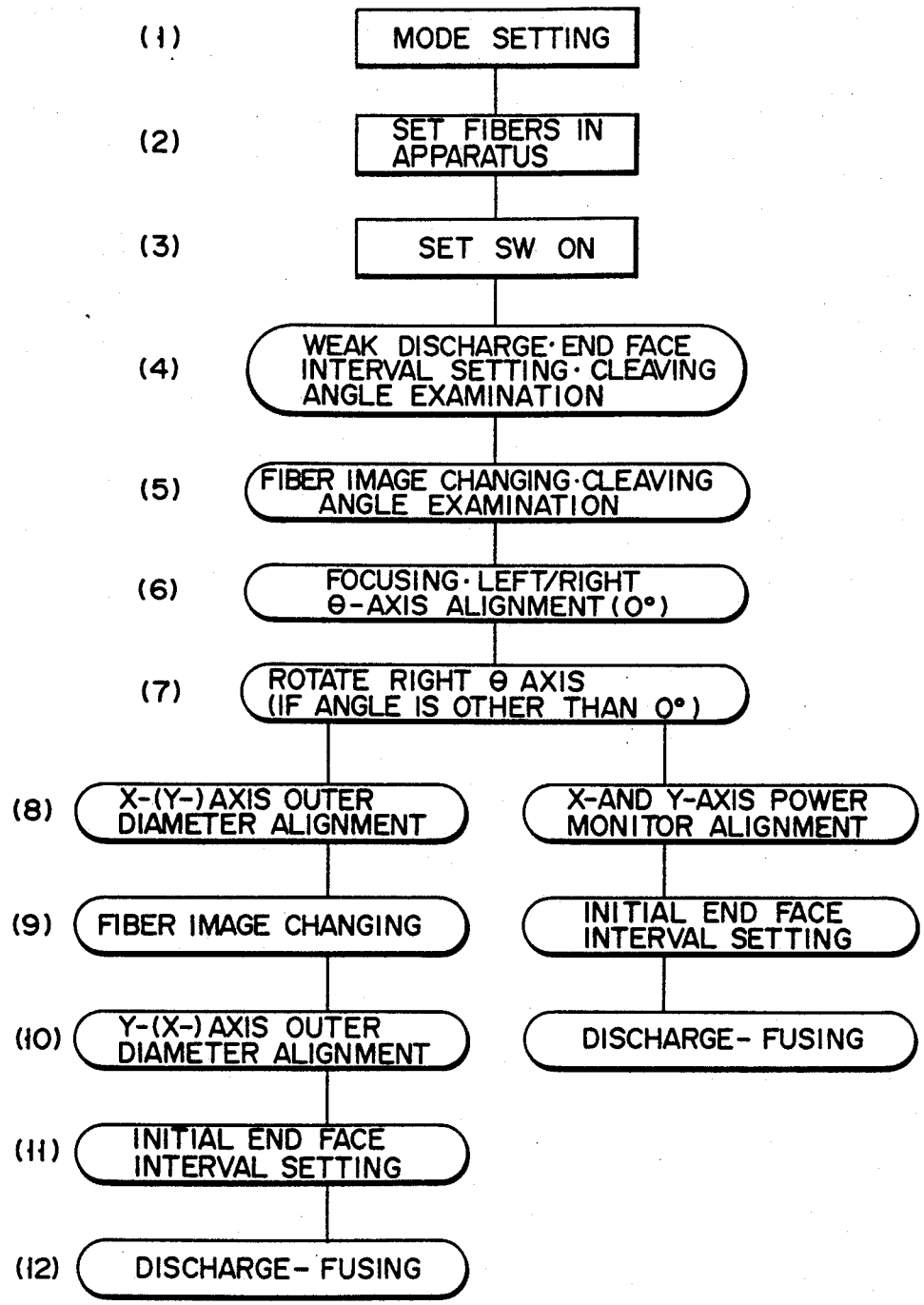
FIG. 12 is a flow chart for explaining the operation of the fusion-splicing apparatus shown in FIG. 10A.

Although a sequence will be easily understood from FIG. 12, it will be briefly described below.

Stage (1):

By using the operation box shown in FIG. 11, (1) as x and y alignment, outer diameter alignment is selected when eccentricity is small, and remote injection and detection system is selected when eccentricity is large and (2) an offset angle of stress applying members 18 is selected from 0°, 90° and 45°.

Stage (3):

Operations are automatically performed from this stage.

Stage (6):

alignment is performed.

Stage (7):

Cylindrical member 34A is rotated through 90° or 45° on the basis of the set values in stage (1) using rotational angle detector 110.

Stage (8) and thereafter:

If outer diameter alignment is set in stage (1), the flow advances to a left-hand route. If remote injection and detection system is set in stage (1), the flow advances to a right-hand route.

A modification of the embodiment shown in FIGS. 10A and 10B will be described below.

Instead of rotational angle detector 110, a stepping motor with a harmonic drive (reduction gears) is used. In this case, if an output shaft of the harmonic drive is directly connected to cylindrical member 34A, backlash becomes zero, and constant-tension spring 108 need not be used.

In automatic θ alignment, when the direction which is perpendicular to the axes of the stress applying members of one of a pair of polarization maintaining optical fibers is shifted by 45° (FIG. 1C) or 90° (FIG. 1B) from the direction which is perpendicular to the axes of the stress applying members of the other of the pair of polarization maintaining optical fibers, stress applying members 18 of the fibers are caused to coincide with each other, and then the stepping motor with a harmonic drive is rotated to rotate member 34A through 45° or 90°, as described above.

The following effects can be achieved by the embodiment shown in FIGS. 10A and 10B.

(1) Since θ-axis alignment is automatically performed by image processing, alignment precision can be improved, a splice-loss can be reduced, and an extinction ratio can be improved.

In addition, since the operation is not manually performed, stable splicing can be obtained.

(2) Fusion-splicing can be obtained at an arbitrary angle by using a rotational angle detector.

(3) A stabilized light source, a power meter, a polarizer, a sensor, and an analyzer need not be used, and therefore adjustment of these parts for each fusion-splicing need not be performed. (If outer diameter alignment cannot be performed because eccentricity of a fiber is large, only a stabilized light source and a power meter are required, but a polarizer, a sensor, and an analyzer requiring a long adjustment time need not be used.)

What is claimed is:

1. An apparatus for fusion-splicing polarization maintaining optical fibers, comprising:
   v-groove member means movable in x and y directions, for receiving exposed portions of a pair of polarization maintaining optical fibers;
   z-axis table means movable in a z direction;
   first clamp means for clamping said exposed portions of said optical fibers into said V-groove member means; and
   second clamp means for clamping jacketed portions of both of said optical fibers onto said z axis table means and for rotating at least one of said optical fibers in a circumferential direction thereof while clamping said jacketed portions;
   said second clamp means comprising a pair of manually rotatable arms, each arm comprising:
   a groove for receiving a jacketed portion of one of said optical fibers;
   cover means openably mounted on said arm for closing said groove; and
   pusher means for pushing said jacketed portions of said one of said optical fibers onto said groove when said cover closes said groove.

2. An apparatus for fusion-splicing polarization maintaining optical fibers, comprising:
   V-groove member means movable in x and y directions, for receiving exposed portions of a pair of polarization maintaining optical fibers;
   z-axis table means movable in a z direction;
   first clamp means for clamping said exposed portions of said optical fibers into said V-groove member means; and
   second clamp means for clamping jacketed portions of both of said optical fibers onto said z axis table means and for rotating at least one of said optical fibers in a circumferential direction thereof while clamping said jacketed portions;
   said second clamp means comprising a pair of manually rotatable arms, each arm comprising:
   a plurality of elongated pieces together forming a cylindrical form, and including means for receiving a jacketed portion of one of said optical fibers; and
   pusher means attached on an inner surface of said elongated pieces for clamping said jacketed portion of said one of said optical fibers received in said receiving means of said elongated pieces.

3. An apparatus for fusion-splicing polarization maintaining optical fibers, comprising:
   V-groove member means movable in x and y directions, for receiving exposed portions of a pair of polarization maintaining optical fibers;
   z-axis table means movable in a z direction;
   first clamp means for clamping said exposed portions of said optical fibers into said V-groove member means; and
   second clamp means for clamping jacketed portions of both of said optical fibers onto said z axis table means and for rotating at least one of said optical fibers in a circumferential direction thereof while clamping said jacketed portions;
   said second clamp means comprising a pair of manually rotatable arms, each arm comprising:
   two pieces forming together a cylndrical form;
   a guide plate having a groove for receiving a jacketed portion of one of said optical fibers; and
   pusher means comprising two pieces attached on said elongated pieces and having V-grooves for clamping therein said jacketed portion of said one of said optical fibers.

* * * * *